US010974708B2

(12) United States Patent
Takayama et al.

(10) Patent No.: US 10,974,708 B2
(45) Date of Patent: Apr. 13, 2021

(54) BICYCLE CONTROL DEVICE AND BRAKE SYSTEM

(71) Applicant: Shimano Inc., Osaka (JP)

(72) Inventors: Hitoshi Takayama, Osaka (JP);
Toshihiko Takahashi, Osaka (JP);
Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 213 days.

(21) Appl. No.: 16/142,490

(22) Filed: Sep. 26, 2018

(65) Prior Publication Data
US 2019/0118785 A1 Apr. 25, 2019

(30) Foreign Application Priority Data

Oct. 20, 2017 (JP) .............................. JP2017-203757

(51) Int. Cl.
B60T 8/32 (2006.01)
B60T 8/17 (2006.01)
B60T 8/26 (2006.01)
B62L 3/02 (2006.01)
B62M 6/40 (2010.01)
B60T 8/171 (2006.01)
B62L 3/00 (2006.01)

(52) U.S. Cl.
CPC ............ *B60T 8/3225* (2013.01); *B60T 8/171* (2013.01); *B60T 8/1706* (2013.01); *B62L 3/00* (2013.01); *B62L 3/02* (2013.01); *B62M 6/40* (2013.01); *B60T 8/261* (2013.01); *B60T 2210/12* (2013.01); *B60T 2210/30* (2013.01); *B60T 2250/00* (2013.01); *B60T 2250/02* (2013.01)

(58) Field of Classification Search
None
See application file for complete search history.

(56) References Cited

U.S. PATENT DOCUMENTS

| 5,244,259 | A  | * | 9/1993  | Pickenhahn | B60T 8/1706 303/137 |
| 5,297,859 | A  | * | 3/1994  | Suzuki | B60T 8/1706 303/137 |
| 7,841,671 | B2 | * | 11/2010 | Nakayama | B62L 3/023 303/137 |
| 7,895,951 | B1 | * | 3/2011  | McGrath, Jr. | B60L 5/005 104/292 |
| 7,908,822 | B2 | * | 3/2011  | McClure | A01F 15/0715 53/52 |

(Continued)

FOREIGN PATENT DOCUMENTS

| CN | 102336184 A | 2/2012 |
| CN | 106064660 A | 11/2016 |

(Continued)

*Primary Examiner* — Abdhesh K Jha
(74) *Attorney, Agent, or Firm* — Global IP Counselors, LLP

(57) ABSTRACT

A brake control device and a brake system are configured to appropriately apply a braking force to a rotary body of a human-powered vehicle. The brake control device includes an electronic controller that controls a braking portion electrically driven to brake a rotary body rotating in accordance with traveling of a human-powered vehicle. The electronic controller controls the braking portion in accordance with an operation amount of an operating device and a state related to the human-powered vehicle.

21 Claims, 4 Drawing Sheets

(56) References Cited

U.S. PATENT DOCUMENTS

| | | | | |
|---|---|---|---|---|
| 9,453,546 | B2* | 9/2016 | Kariyama | B62L 3/023 |
| 2004/0186648 | A1* | 9/2004 | Zheng | B60T 8/3655 |
| | | | | 701/70 |
| 2005/0029858 | A1* | 2/2005 | Forster | F16D 65/18 |
| | | | | 303/20 |
| 2006/0094569 | A1* | 5/2006 | Day | A63B 22/0012 |
| | | | | 482/57 |
| 2008/0111342 | A1* | 5/2008 | Niekerk | B60T 8/329 |
| | | | | 280/261 |
| 2011/0315493 | A1* | 12/2011 | Stilwell | B60T 13/662 |
| | | | | 188/152 |
| 2012/0241264 | A1 | 9/2012 | Hosaka et al. | |
| 2014/0306513 | A1* | 10/2014 | Cunningham | B60T 8/442 |
| | | | | 303/4 |
| 2015/0210256 | A1* | 7/2015 | Yamashita | B60T 13/147 |
| | | | | 303/14 |
| 2016/0375347 | A1 | 12/2016 | Stubberud | |
| 2017/0247080 | A1* | 8/2017 | Tsuchizawa | B60L 15/20 |
| 2018/0178768 | A1* | 6/2018 | Ono | B60T 8/261 |
| 2018/0265056 | A1* | 9/2018 | Hasegawa | B60T 7/12 |
| 2019/0225199 | A1* | 7/2019 | Zhang | B60T 8/17551 |

FOREIGN PATENT DOCUMENTS

| | | |
|---|---|---|
| CN | 206501963 U | 9/2017 |
| JP | 2011-83081 A | 4/2011 |
| JP | 2017-30395 A | 2/2017 |
| JP | 2017-43333 A | 3/2017 |

\* cited by examiner

BICYCLE CONTROL DEVICE AND BRAKE SYSTEM

CROSS-REFERENCE TO RELATED APPLICATIONS

This application claims priority to Japanese Patent Application No. 2017-203757, filed on Oct. 20, 2017. The entire disclosure of Japanese Patent Application No. 2017-203757 is hereby incorporated herein by reference.

BACKGROUND

Field of the Invention

The present invention generally relates to a brake control device and a brake system including a brake control device.

Background Information

A brake system that is installed in a human-powered vehicle and driven by electric power is known. For example, a brake system is disclosed in Japanese Laid-Open Patent Publication No. 2017-30395 (patent document 1) that includes a braking portion that brakes a rotary body of a human-powered vehicle, an electric actuator that drives the braking portion, and a brake control device that controls the electric actuator.

SUMMARY

It is preferred that a rotary body of a human-powered vehicle is appropriately braked. One object of the present disclosure to provide a brake control device and a brake system that appropriately brake a rotary body of a human-powered vehicle.

A brake control device according to a first aspect of the present disclosure includes an electronic controller configured to output a control signal to electrically control a brake device to apply a braking force to a rotary body rotating in accordance with traveling of a human-powered vehicle. The electronic controller is configured to vary the braking force applied to a braking portion of the brake device in accordance with an operation amount of an operating device and a state related to the human-powered vehicle as detected by a sensor. Thus, the rotary body of the human-powered vehicle is appropriately braked regardless of a change in the state related to the human-powered vehicle.

In accordance with a second aspect of the present disclosure, the brake control device according to the first aspect is configured so that the electronic controller is further configured to set a transition aspect of the braking force associated with driving of the braking portion to vary the braking force corresponding to the operation amount in accordance with the state related to the human-powered vehicle. Thus, a desired braking force is applied to the rotary body of the human-powered vehicle in accordance with the operation amount of the operating device regardless of a change in the state related to the human-powered vehicle.

In accordance with a third aspect of the present disclosure, the brake control device according to the second aspect is configured so that the electronic controller is further configured to change the transition aspect of the braking force in a stepped manner in accordance with the operation amount. Thus, an appropriate brake feel is obtained.

In accordance with a fourth aspect of the present disclosure, the brake control device according to the second or third aspect is configured so that the state related to the human-powered vehicle includes a travel speed of the human-powered vehicle. Thus, the rotary body of the human-powered vehicle is appropriately braked regardless of the travel speed of the human-powered vehicle.

In accordance with a fifth aspect of the present disclosure, the brake control device according to the fourth aspect is configured so that the electronic controller is further configured to control the braking portion so that the transition aspect of the braking force in a case where the travel speed is greater than or equal to a predetermined travel speed differs from the transition aspect of the braking force in a case where the travel speed is less than the predetermined travel speed. Thus, a change in the travel speed of the human-powered vehicle is coped with by a simple control, and the rotary body of the human-powered vehicle is appropriately braked.

In accordance with a sixth aspect of the present disclosure, the brake control device according to any one of the second to fifth aspects is configured so that the state related to the human-powered vehicle includes an inclination angle of the human-powered vehicle. Thus, the rotary body of the human-powered vehicle is appropriately braked regardless of the inclination angle of the human-powered vehicle.

In accordance with a seventh aspect of the present disclosure, the brake control device according to the sixth aspect is configured so that the electronic controller is further configured to control the braking portion so that the transition aspect of the braking force in a case where the inclination angle is greater than or equal to a predetermined angle differs from the transition aspect of the braking force in a case where the inclination angle is less than the predetermined angle. Thus, the braking portion is controlled so that, for example, the transition aspect of the braking force applied in traveling straight differs from the transition aspect of the braking force applied in making a curve, and the rotary body of the human-powered vehicle is appropriately braked.

In accordance with an eighth aspect of the present disclosure, the brake control device according to the sixth or seventh aspect is configured so that the inclination angle indicates a forward inclination angle of the human-powered vehicle. Thus, the rotary body of the human-powered vehicle is appropriately braked regardless of the forward inclination angle of the human-powered vehicle.

In accordance with a ninth aspect of the present disclosure, the brake control device according to any one of the second to eighth aspects is configured so that the state related to the human-powered vehicle includes a gross weight of the human-powered vehicle. Thus, the rotary body of the human-powered vehicle is appropriately braked regardless of the gross weight of the human-powered vehicle.

In accordance with a tenth aspect of the present disclosure, the brake control device according to the ninth aspect is configured so that the electronic controller is further configured to control the braking portion so that the transition aspect of the braking force in a case where the gross weight is greater than or equal to a predetermined weight differs from the transition aspect of the braking force in a case where the gross weight is less than the predetermined weight. Thus, a change in the gross weight of the human-powered vehicle is coped with by a simple control, and the rotary body of the human-powered vehicle is appropriately braked.

In accordance with an eleventh aspect of the present disclosure, the brake control device according to the ninth or tenth aspect is configured so that the electronic controller is further configured to increase an increase rate of the braking force with respect to a given one of the operation amount as the gross weight increases. Thus, the rotary body of the human-powered vehicle is further appropriately braked regardless of the gross weight of the human-powered vehicle.

In accordance with a twelfth aspect of the present disclosure, the brake control device according to any one of the second to eleventh aspects is configured so that the state related to the human-powered vehicle includes a travel resistance of the human-powered vehicle. Thus, the rotary body of the human-powered vehicle is appropriately braked regardless of the travel resistance of the human-powered vehicle.

In accordance with a thirteenth aspect of the present disclosure, the brake control device according to the twelfth aspect is configured so that the electronic controller is further configured to control the braking portion so that the transition aspect of the braking force in a case where the travel resistance is greater than or equal to a predetermined resistance differs from the transition aspect of the braking force in a case where the travel resistance is less than the predetermined resistance. Thus, a change in the travel resistance of the human-powered vehicle is coped with by a simple control, and the rotary body of the human-powered vehicle is appropriately braked.

In accordance with a fourteenth aspect of the present disclosure, the brake control device according to the twelfth or thirteenth aspect is configured so that the electronic controller is further configured to decrease an increase rate of the braking force with respect to a given one of the operation amount as the travel resistance increases. Thus, the rotary body of the human-powered vehicle is further appropriately braked regardless of the travel resistance of the human-powered vehicle.

In accordance with a fifteenth aspect of the present disclosure, the brake control device according to any one of the second to fourteenth aspects is configured so that the state related to the human-powered vehicle includes a travel environment of the human-powered vehicle. Thus, the rotary body of the human-powered vehicle is appropriately braked regardless of the travel environment of the human-powered vehicle.

In accordance with a sixteenth aspect of the present disclosure, the brake control device according to the fifteenth aspect is configured so that the electronic controller is further configured to control the braking portion so that the transition aspect of the braking force in a case where the travel environment is a first environment differs from the transition aspect of the braking force in a case where the travel environment is a second environment. Thus, a change in the travel environment is coped with by a simple control, and the rotary body of the human-powered vehicle is appropriately braked.

In accordance with a seventeenth aspect of the present disclosure, the brake control device according to any one of the second to sixteenth aspects further includes memory configured to store information specifying a relationship among the operation amount, the state related to the human-powered vehicle, and the braking force. Thus, the braking portion is easily controlled in accordance with the information stored in the storage, and the rotary body of the human-powered vehicle is appropriately braked.

A brake system according to an eighteenth aspect of the present disclosure comprises the brake control device according to any one of the first to seventeenth aspects, and further comprises the brake device that includes the braking portion, and an electric actuator that drives the braking portion in response to the control signal from the electronic controller. Thus, a brake system using the brake control device to appropriately brake the rotary body of the human-powered vehicle is obtained.

In accordance with a nineteenth aspect of the present disclosure, the brake system according to the eighteenth aspect is configured so that the electric actuator includes an electric motor that is different from an electric motor assisting propulsion force of the human-powered vehicle. Thus, even while propulsion force of the human-powered vehicle is assisted, the rotary body of the human-powered vehicle is appropriately braked.

In accordance with a twentieth aspect of the present disclosure, the brake system according to the eighteenth or nineteenth aspects is configured so that the electric actuator is provided to the braking portion. Thus, the configuration of the brake system is simplified.

In accordance with a twenty-first aspect of the present disclosure, the brake system according to any one of the eighteenth to twentieth aspects further includes the operating device. Thus, the rotary body of the human-powered vehicle is appropriately braked in accordance with the operation amount of the operating device.

In accordance with a twenty-second aspect of the present disclosure, the brake system according to the twenty-first aspect is configured so that the operating device includes a lever. Thus, the operability of the operating portion is increased.

The brake control device and the brake system according to the present disclosure appropriately brake the rotary body of the human-powered vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiments

Figure 1:
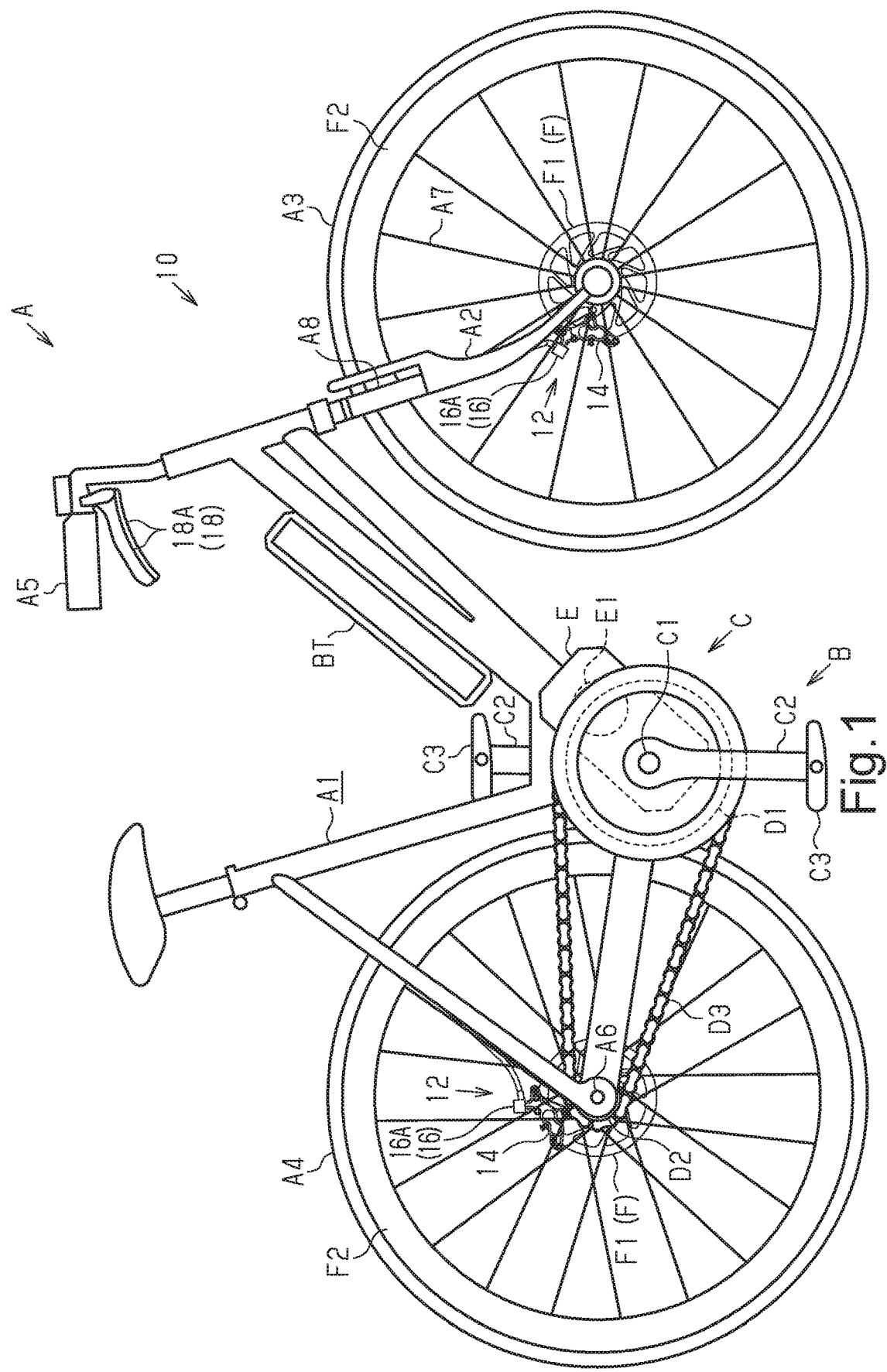
FIG. 1 is a side elevational view of a human-powered vehicle (bicycle) equipped with a brake system having a brake control device in accordance with one embodiment.

A human-powered vehicle A that includes a brake system 10 will now be described with reference to FIG. 1. The human-powered vehicle A includes the brake system 10.

Here, the term "human-powered vehicle" refers to a vehicle that at least partially uses human (muscular) power as driving power for traveling, and includes a vehicle that electrically assists the human power. A vehicle that uses only driving power other than human power is not included in the human-powered vehicle. In particular, a vehicle that uses only an internal combustion engine as driving power is not included in the human-powered vehicle. The human-powered vehicle is generally assumed to be a compact light vehicle or a vehicle that does not require a license for driving on a public road. The illustrated human-powered vehicle A is a bicycle (e-bike) that is electrically driven in an auxiliary manner. More specifically, the illustrated human-powered vehicle A is a city bike. The human-powered vehicle A further includes a frame A1, a front fork A2, a front wheel A3, a rear wheel A4, a handlebar A5 and a drivetrain B.

The drivetrain B includes a crank assembly C, a front sprocket D1, a rear sprocket D2, and a chain D3. The crank assembly C includes a crankshaft C1, a pair of crank arms C2, and a pair of pedals C3. The pair of pedals C3 is rotatably coupled to distal ends of the crank arms C2.

The front sprocket D1 is provided at the crank assembly C to rotate integrally with the crankshaft C1. The rear sprocket D2 is provided at a hub A6 of the rear wheel A4. The chain D3 runs around the front sprocket D1 and the rear sprocket D2. Driving force applied to the pedals C3 by the rider of the human-powered vehicle A is transmitted via the front sprocket D1, the chain D3, and the rear sprocket D2 to the rear wheel A4.

The human-powered vehicle A further includes an electric assist unit E. The electric assist unit E operates to assist propulsion force of the human-powered vehicle A. The electric assist unit E operates in accordance with, for example, the driving force applied to the pedals C3. The electric assist unit E includes an electric motor E1. The electric assist unit E is driven by electric power supplied from a battery BT installed in the human-powered vehicle A.

The brake system 10 includes a pair of brake devices 12. In the present embodiment, the brake devices 12 are disc brake devices that each apply a braking force to a rotary body F of the human-powered vehicle A. The brake devices 12 can be more simply referred to as a brake. The rotary bodies F are disc brake rotors F1. One of the disc brake rotors F1 is provided to each of the front wheel A3 and the rear wheel A4 of the human-powered vehicle A. One of the brake devices 12 is provided corresponding to, for example, the front wheel A3. The other of the brake devices 12 is provided corresponding to, for example, the rear wheel A4. The brake devices 12 have the same structure. Alternatively, the brake devices 12 can be rim brake devices. In this case, the rotary bodies F are rims F2.

The brake system 10 further includes two braking portions 14 and two electric actuators 16. The braking portions 14 are electrically driven to apply a braking force to the rotary bodies F, which rotate in accordance with traveling of the human-powered vehicle A. The electric actuators 16 drive the braking portions 14. In the present embodiment, the brake devices 12 include the braking portions 14 and the electric actuators 16. The braking portions 14 each include a caliper that clamps the rotary body F. The electric actuators 16 each include an electric motor 16A that is different from the electric motor E1 of the electric assist unit E, which assists propulsion force of the human-powered vehicle A. In other words, the electric motors 16A are not an electric motor that assists in propulsion of the human-powered vehicle. The electric actuators 16 are driven, for example, by electric power supplied from the battery BT. In the present embodiment, the electric actuators 16 are provided at housings of the braking portions 14. In another example, the electric actuators 16 are provided separately from the braking portions 14. More specifically, the electric actuators 16 are provided at any location such as the frame A1, the front fork A2, or the handlebar A5.

The brake system 10 further includes a pair of operating devices 18. The operating devices 18 are provided at the left side of the handlebar A5 and the right side of the handlebar A5 with respect to a center plane of the human-powered vehicle A. The pair of operating devices 18 each includes a user operated lever 18A (hereinafter referred to as "the lever"). One of the brake devices 12 is driven in accordance with an operation of the lever 18A of one of the operating devices 18, and the other brake device 12 is driven in accordance with an operation of the other lever 18A. The brake devices 12 can be operated in accordance with an operation of each of the pair of operating devices 18. In this case, the ratio of braking forces applied to the brake devices 12 by an operation of one of the operating devices 18 can differ from the ratio of braking forces applied to the brake devices 12 by an operation of the other operating device 18.

Figure 2:
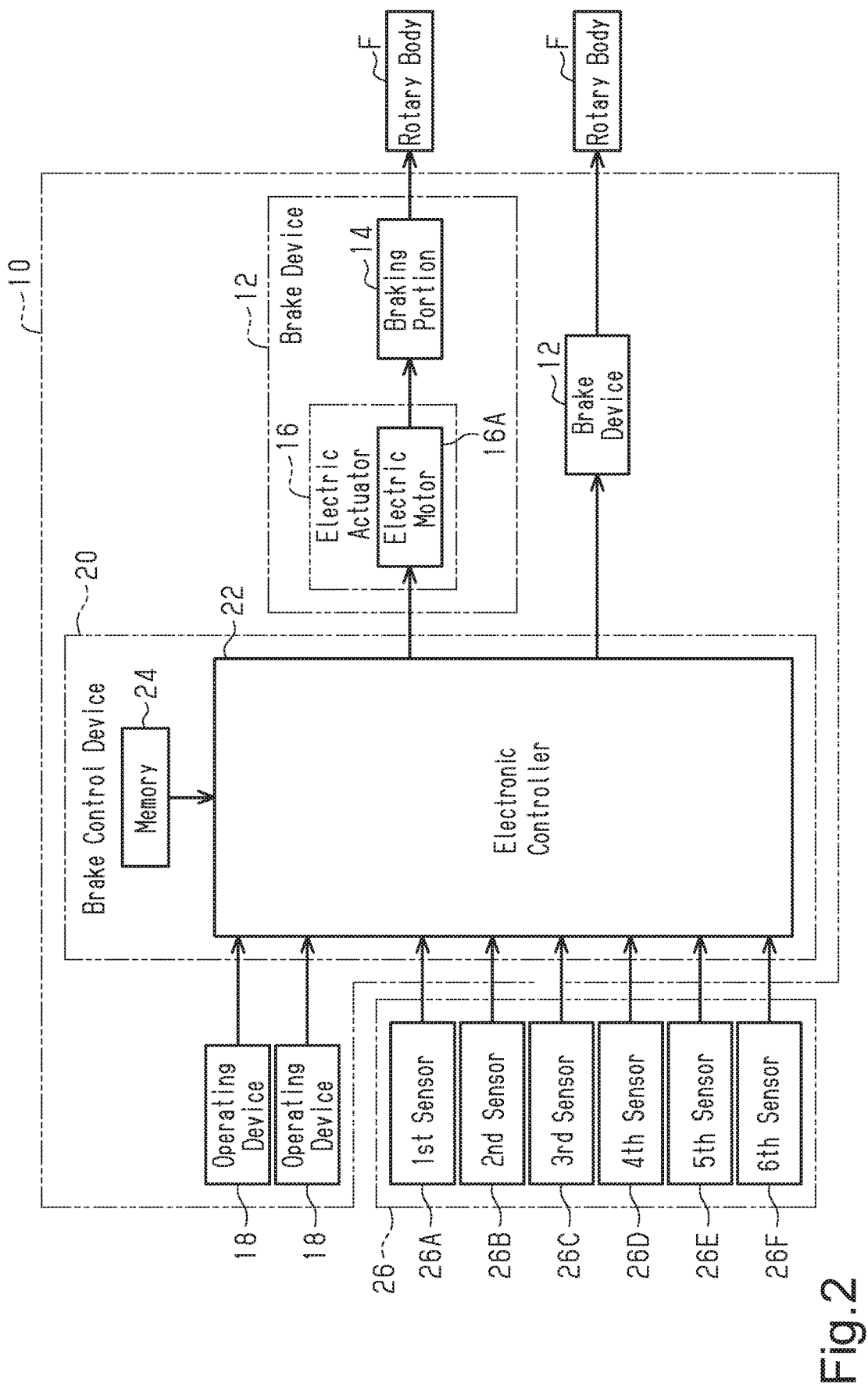
FIG. 2 is a block diagram of the brake system having the brake control device of the human-powered vehicle shown in FIG. 1.

As shown in FIG. 2, the brake system 10 further includes a brake control device 20. The brake control device 20 includes an electronic controller 22 that is configured to control the braking portions 14. The brake control device 20 is driven, for example, by electric power supplied from the battery BT. The electronic controller 22 is a central processing unit (CPU) or a micro processing unit (MPU) that includes one or more processors. The electronic controller 22 is formed of one or more semiconductor chips mounted on a printed circuit board. The term "electronic controller" as used herein refers to hardware that executes a software program. The electronic controller 22 controls the braking portions 14 by controlling the electric actuators 16.

The electronic controller 22 controls the braking portions 14 in accordance with an operation amount S of the operating devices 18 and a state related to the human-powered vehicle A. The operation amount S can be selected from, for example, a rotation amount of the lever 18A with respect to an initial state in which the lever 18A is not operated, a rotation speed of the lever 18A, a rotation acceleration of the lever 18A, an input load to the lever 18A, or a combination of these. The electronic controller 22 sets a transition aspect of a braking force BF, which is associated with driving of the braking portions 14 corresponding to the operation amount S, in accordance with the state related to the human-powered vehicle A. The electronic controller 22 changes the transition aspect of the braking force BF in a stepped manner in accordance with the operation amount S.

The state related to the human-powered vehicle A includes a travel speed TS of the human-powered vehicle A. The electronic controller 22 controls the braking portions 14 so that the transition aspect of the braking force BF in a case where the travel speed TS is greater than or equal to a predetermined travel speed differs from the transition aspect of the braking force BF in a case where the travel speed TS is less than the predetermined travel speed. In the present embodiment, the electronic controller 22 sets the transition aspect of the braking force BF to a first state (refer to FIG. 3) in a case where the travel speed TS is less than the predetermined travel speed, and sets the transition aspect of the braking force BF to a second state (refer to FIG. 4) in a case where the travel speed TS is greater than or equal to the predetermined travel speed. The second state is greater than the first state in an increase rate of the braking force BF with respect to a given operation amount S. The electronic controller 22 can increase the increase rate of the braking force BF with respect to the given operation amount S as the travel speed TS increases.

The state related to the human-powered vehicle A includes an inclination angle IA of the human-powered vehicle A. The inclination angle IA correlates with the gradient of the road surface. The electronic controller 22 controls the braking portions 14 so that the transition aspect of the braking force BF in a case where the inclination angle IA is greater than or equal to a predetermined angle differs from the transition aspect of the braking force BF in a case where the inclination angle IA is less than the predetermined angle. The inclination angle IA indicates a forward inclination angle of the human-powered vehicle A. In the present embodiment, the electronic controller 22 sets the transition aspect of the braking force BF to the first state in a case where the inclination angle IA is less than the predetermined angle, and sets the transition aspect of the braking force BF to the second state in a case where the inclination angle IA is greater than or equal to the predetermined angle. The electronic controller 22 can increase the increase rate of the braking force BF with respect to the given operation amount S as the inclination angle IA increases.

The state related to the human-powered vehicle A includes a gross weight GW of the human-powered vehicle A. The gross weight GW is the weight of the human-powered vehicle A in a state where the rider mounts. The gross weight GW includes, for example, the weight of the human-powered vehicle A, the weight of the rider, and the weight of loads mounted on a basket, a carrier, and the like (not shown) of the human-powered vehicle A. The electronic controller 22 controls the braking portions 14 so that the transition aspect of the braking force BF in a case where the gross weight GW is greater than or equal to a predetermined weight differs from the transition aspect of the braking force BF in a case where the gross weight GW is less than the predetermined weight. In the present embodiment, the electronic controller 22 increases the increase rate of the braking force BF with respect to the given operation amount S as the gross weight GW increases. The electronic controller 22 can set the transition aspect of the braking force BF to the first state in a case where the gross weight GW is less than the predetermined weight, and set the transition aspect of the braking force BF to the second state in a case where the gross weight GW is greater than or equal to the predetermined weight.

The state related to the human-powered vehicle A includes a travel resistance RR of the human-powered vehicle A. The travel resistance RR includes, for example, at least one of irregularities on the road surface and a friction resistance of the road surface. The electronic controller 22 controls the braking portions 14 so that the transition aspect of the braking force BF in a case where the travel resistance RR is greater than or equal to a predetermined resistance differs from the transition aspect of the braking force BF in a case where the travel resistance RR is less than the predetermined resistance. In the present embodiment, the electronic controller 22 decreases the increase rate of the braking force BF with respect to the given operation amount S as the travel resistance RR increases. Additionally, in a case where the friction resistance of the road surface is relatively small and the travel resistance RR indicates that the road surface is slippery, it is preferred that the electronic controller 22 control the braking portions 14 so that relatively weak braking forces BF act on the rotary bodies F. The electronic controller 22 can set the transition aspect of the braking force BF to the first state in a case where the travel resistance RR is less than the predetermined resistance, and set the transition aspect of the braking force BF to a third state (refer to FIG. 5) in a case where the travel resistance RR is greater than or equal to the predetermined resistance. The third state is less than the first state in the increase rate of the braking force BF with respect to the given operation amount S.

The state related to the human-powered vehicle A includes a travel environment DE of the human-powered vehicle A. The travel environment DE indicates, for example, a state of the visibility of the rider. The travel environment DE includes, for example, at least one of the weather and time. The electronic controller 22 controls the braking portions 14 so that the transition aspect of the braking force BF in a case where the travel environment DE is a first environment differs from the transition aspect of the braking force BF in a case where the travel environment DE is a second environment. The first environment indicates, for example, a state where the visibility of the rider is good. The second environment indicates, for example, a state where the visibility of the rider is lower than that of the first environment. In the present embodiment, in a case where the travel environment DE is the first environment, the transition aspect of the braking force BF is set to the first state. In a case where the travel environment DE is the second environment, the transition aspect of the braking force BF is set to the second state. The electronic controller 22 can increase the increase rate of the braking force BF with respect to the given operation amount S as the travel environment DE approaches the second environment from the first environment.

The electronic controller 22 sets the transition aspect of the braking force BF in accordance with at least one of the elements in the travel speed TS, the inclination angle IA, the gross weight GW, the travel resistance RR, and the travel environment DE as the state related to the human-powered vehicle A. For example, in a case where the electronic controller 22 refers to two or more elements as the state related to the human-powered vehicle A, the electronic controller 22 changes the transition aspect of the braking force BF in accordance with the first one of the elements in the state related to the human-powered vehicle A that satisfies the condition for changing the transition aspect of the braking force BF. In a case where the electronic controller 22 refers to two or more elements as the state related to the human-powered vehicle A, the electronic controller 22 can change the transition aspect of the braking force BF in accordance with the last one of the elements in the state related to the human-powered vehicle A that satisfies the condition for changing the transition aspect of the braking force BF.

Figure 3:
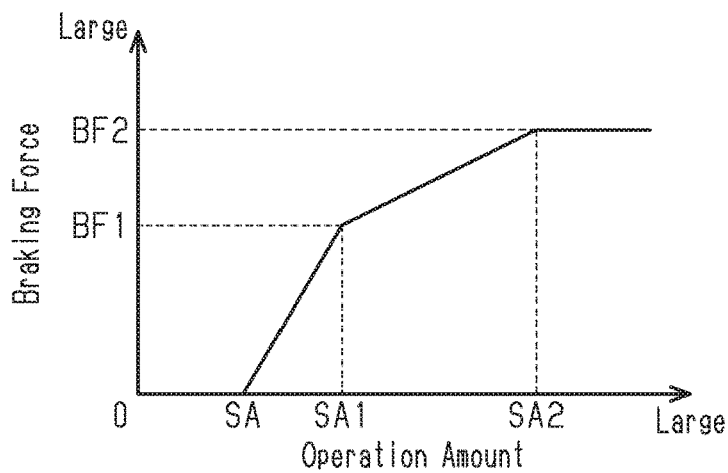
FIG. 3 is a graph showing one example of a transition aspect of braking force in a first state.

The transition aspect of the braking force BF will now be described with reference to FIGS. 3 to 5. FIG. 3 shows one example of the transition aspect of the braking force BF that is set in the first state. In a case where the operation amount S is included in a range from the initial state to a reference operation amount SA, the electronic controller 22 controls the braking portions 14 so that the braking force BF will not act on the rotary bodies F. In a case where the operation amount S is included in a range from the reference operation amount SA to a first operation amount SA1 (hereafter, referred to as "first operation range SR1"), the electronic controller 22 controls the braking portions 14 so that as the operation amount S increases, the braking force BF increases. In a case where the operation amount S is the first operation amount SA1, the electronic controller 22 controls the braking portions 14 so that a first braking force BF1 acts on the rotary bodies F as the braking force BF.

In a case where the operation amount S is included in a range from the first operation amount SA1 to a second operation amount SA2 (hereafter, referred to as "second operation range SR2"), the electronic controller 22 controls the braking portions 14 so that as the operation amount S increases, the braking force BF increases. In a case where the operation amount S is the second operation amount SA2, the electronic controller 22 controls the braking portions 14 so that a second braking force BF2 acts on the rotary bodies F as the braking force BF. In the present embodiment, the increase rate of the braking force BF corresponding to a case where the operation amount S is included in the first operation range SR1 (hereafter, referred to as "first increase rate IR1") is greater than the increase rate of the braking force BF corresponding to a case where the operation amount S is included in the second operation range SR2 (hereafter, referred to as "second increase rate IR2"). In a case where the operation amount S is greater than or equal to the second operation amount SA2, the electronic controller 22 controls the braking portions 14 so that the second braking force BF2 acts on the rotary bodies F as the braking force BF. In the transition aspect of the braking force BF that is set in the first state, an appropriate brake feel is obtained.

Figure 4:
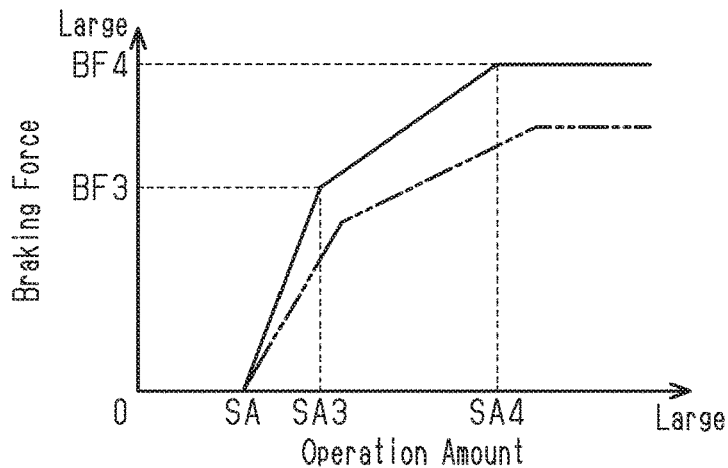
FIG. 4 is a graph showing one example of a transition aspect of braking force in a second state.

FIG. 4 shows one example of the transition aspect of the braking force BF that is set in the second state. In a case where the operation amount S is included in the range from the initial state to the reference operation amount SA, the electronic controller 22 controls the braking portions 14 so that the braking force BF will not act on the rotary bodies F. In a case where the operation amount S is included in a range from the reference operation amount SA to a third operation amount SA3 (hereafter, referred to as "third operation range SR3"), the electronic controller 22 controls the braking portions 14 so that as the operation amount S increases, the braking force BF increases. In a case where the operation amount S is the third operation amount SA3, the electronic controller 22 controls the braking portions 14 so that a third braking force BF3 acts on the rotary bodies F as the braking force BF. In the example shown in FIG. 4, the third braking force BF3 is greater than the first braking force BF1, and the third operation amount SA3 is less than the first operation amount SA1. The double-dashed line in FIG. 4 shows the transition aspect of the braking force BF that is shown in FIG. 3. The increase rate of the braking force BF corresponding to a case where the operation amount S is included in the third operation range SR3 (hereafter, referred to as "third increase rate IR3") is greater than the first increase rate IR1.

In a case where the operation amount S is included in a range from the third operation amount SA3 to a fourth operation amount SA4 (hereafter, "fourth operation range SR4"), the electronic controller 22 controls the braking portions 14 so that as the operation amount S increases, the braking force BF increases. In a case where the operation amount S is the fourth operation amount SA4, the electronic controller 22 controls the braking portions 14 so that a fourth braking force BF4 acts on the rotary bodies F as the braking force BF. In the example shown in FIG. 4, the fourth braking force BF4 is greater than the second braking force BF2, and the fourth operation amount SA4 is less than the second operation amount SA2. The increase rate of the braking force BF corresponding to a case where the operation amount S is included in the fourth operation range SR4 (hereafter, referred to as "fourth increase rate IR4") is greater than the second increase rate IR2. In the present embodiment, the third increase rate IR3 is greater than the fourth increase rate IR4. In a case where the operation amount S is greater than or equal to the fourth operation amount SA4, the electronic controller 22 controls the braking portions 14 so that the fourth braking force BF4 acts on the rotary bodies F as the braking force BF. In the transition aspect of the braking force BF that is set in the second state, the braking force BF that is appropriate to the state related to the human-powered vehicle A is applied to the rotary bodies F.

Figure 5:
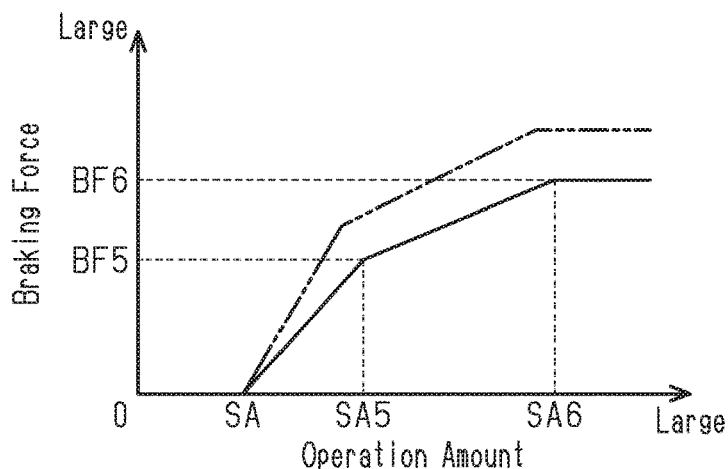
FIG. 5 is a graph showing one example of a transition aspect of braking force in a third state.

FIG. 5 shows one example of the transition aspect of the braking force BF that is set in the third state. In a case where the operation amount S is included in the range from the initial state to the reference operation amount SA, the electronic controller 22 controls the braking portions 14 so that the braking force BF will not act on the rotary bodies F. In a case where the operation amount S is included in a range from the reference operation amount SA to a fifth operation amount SA5 (hereafter, "fifth operation range SR5"), the electronic controller 22 controls the braking portions 14 so that as the operation amount S increases, the braking force BF increases. In a case where the operation amount S is the fifth operation amount SA5, the electronic controller 22 controls the braking portions 14 so that a fifth braking force BF5 acts on the rotary bodies F as the braking force BF. In the example shown in FIG. 5, the fifth braking force BF5 is less than the first braking force BF1, and the fifth operation amount SA5 is greater than the first operation amount SA1. The double-dashed line in FIG. 5 shows the transition aspect of the braking force BF that is shown in FIG. 3. The increase rate of the braking force BF corresponding to a case where the operation amount S is included in the fifth operation range SR5 (hereafter, referred to as "the fifth increase rate IF5") is less than the first increase rate IR1.

In a case where the operation amount S is included in a range from the fifth operation amount SA5 to a sixth operation amount SA6 (hereafter, referred to as "sixth operation range SR6"), the electronic controller 22 controls the braking portions 14 so that as the operation amount S increases, the braking force BF increases. In a case where the operation amount S is the sixth operation amount SA6, the electronic controller 22 controls the braking portions 14 so that a sixth braking force BF6 acts on the rotary bodies F as the braking force BF. In the example shown in FIG. 5, the sixth braking force BF6 is less than the second braking force BF2, and the sixth operation amount SA6 is greater than the second operation amount SA2. The increase rate of the braking force BF corresponding to a case where the operation amount S is included in the sixth operation range SR6 (hereafter, referred to as "sixth increase rate IR6") is less than the second increase rate IR2. In the present embodiment, the fifth increase rate IF5 is greater than the sixth increase rate IR6. In a case where the operation amount S is greater than or equal to the sixth operation amount SA6, the electronic controller 22 controls the braking portions 14 so that the sixth braking force BF6 acts on the rotary bodies F as the braking force BF. In the transition aspect of the braking force BF that is set in the third state, the braking force BF that is appropriate to the state related to the human-powered vehicle A is applied to the rotary bodies F.

As shown in FIG. 2, the brake control device 20 further includes a computer storage device or memory 24 that stores information (hereafter, referred to as "brake information BI") specifying the relationship among the operation amount S, the state related to the human-powered vehicle A, and the braking force BF. The memory 24 stores, for example, preset information. The information stored in the memory 24 in advance can be changed using an appropriate input device (not shown) as necessary. The memory 24 is any computer storage device or any computer readable medium with the sole exception of a transitory, propagating signal. For example, the memory 24 can include nonvolatile memory and volatile memory, and can includes a ROM (Read Only Memory) device, a RAM (Random Access Memory) device, a hard disk, a flash drive, etc. The memory 24 is formed of one or more semiconductor chips mounted on a printed circuit board. The memory 24 can be provided on the same printed circuit board of the electronic controller 22, or can be provided on a separate printed circuit board. The electronic controller 22 obtains the brake information BI corresponding to the state related to the human-powered vehicle A from the memory 24 and controls the braking portions 14 in accordance with the operation amount S and the brake information BI.

The human-powered vehicle A further includes a detection device 26 that detects the operation amount S of the operating devices 18 and the state related to the human-powered vehicle A. In the present embodiment, the detection device 26 includes a first sensor 26A, a second sensor 26B, a third sensor 26C, a fourth sensor 26D, a fifth sensor 26E, and a sixth sensor 26F. The detection device 26, for example, sends various kinds of detected information to the electronic controller 22. The first sensor 26A detects the operation amount S of the operating devices 18. The first sensor 26A, for example, detects one of a rotational amount of the lever 18A, a rotational speed of the lever 18A, a rotational acceleration of the lever 18A, or an input load to the lever 18A, or any combinations thereof. In the present embodiment, the first sensor 26A is provided for each of the operating devices 18. FIG. 2 shows only one of the first sensors 26A.

The second sensor 26B detects the travel speed TS of the human-powered vehicle A. The second sensor 26B includes, for example, a reed switch (not shown) that detects a magnet (not shown) provided on a spoke A7 (refer to FIG. 1) of the front wheel A3. In the present embodiment, the second sensor 26B is provided at the front fork A2. As the second sensor 26B detects the magnet, the rotational speed of the front wheel A3 is detected, and the travel speed TS of the human-powered vehicle A is detected.

The third sensor 26C detects the inclination angle IA of the human-powered vehicle A. The third sensor 26C is, for example, an inclination sensor that detects an inclination of the human-powered vehicle A from a horizontal plane. In the present embodiment, the third sensor 26C is provided at the frame A1. The third sensor 26C (the inclination sensor) is realized by, for example, an acceleration sensor.

The fourth sensor 26D detects the gross weight GW of the human-powered vehicle A. The fourth sensor 26D is, for example, an air pressure sensor that detects air pressures of the front wheel A3 and the rear wheel A4. A change in the air pressures of the front wheel A3 and the rear wheel A4 correlates with the sum of the weight of the human-powered vehicle A and the weight applied to the human-powered vehicle A by the rider, loads, and the like. In the present embodiment, the fourth sensor 26D is provided at either the front wheel A3 or the rear wheel A4, or provided at each of the front wheel A3 and the rear wheel. As the fourth sensor 26D detects the air pressure of at least one of the front wheel A3 and the rear wheel A4, the gross weight GW of the human-powered vehicle A is detected. Alternatively, the fourth sensor 26D can detect the gross weight GW by a plurality of weight sensors that separately detect the weight of the rider and the weight of loads mounted on a basket, a carrier, and the like of the human-powered vehicle A. In this case, a preset value is used as the weight of the human-powered vehicle A.

The fifth sensor 26E detects the travel resistance RR of the human-powered vehicle A. The fifth sensor 26E is, for example, a camera that detects the state of the road surface. In the present embodiment, the fifth sensor 26E is provided at the frame A1 or the handlebar A5. Alternatively, the fifth sensor 26E can detect the travel resistance RR by, for example, air pressure sensors that detects air pressures of the front wheel A3 and the rear wheel A4, a vibration sensor that detects vibration of the human-powered vehicle A, or a movement sensor that detects a stroke of a suspension A8 (refer to FIG. 1).

The sixth sensor 26F detects the travel environment DE of the human-powered vehicle A. The sixth sensor 26F is, for example, a receiver that detects external information related to at least one of the weather and time. In the present embodiment, the sixth sensor 26F is provided at the handlebar A5. The electronic controller 22 obtains various kinds of information including the state related to the human-powered vehicle A from the detection device 26 and obtains the brake information BI corresponding to the obtained information from the storage 24. The sensors 26B to 26F that detect elements that are in the state related to the human-powered vehicle A and are not used for the setting of the transition aspect of the braking force BF can be omitted from the detection device 26.

Figure 6:
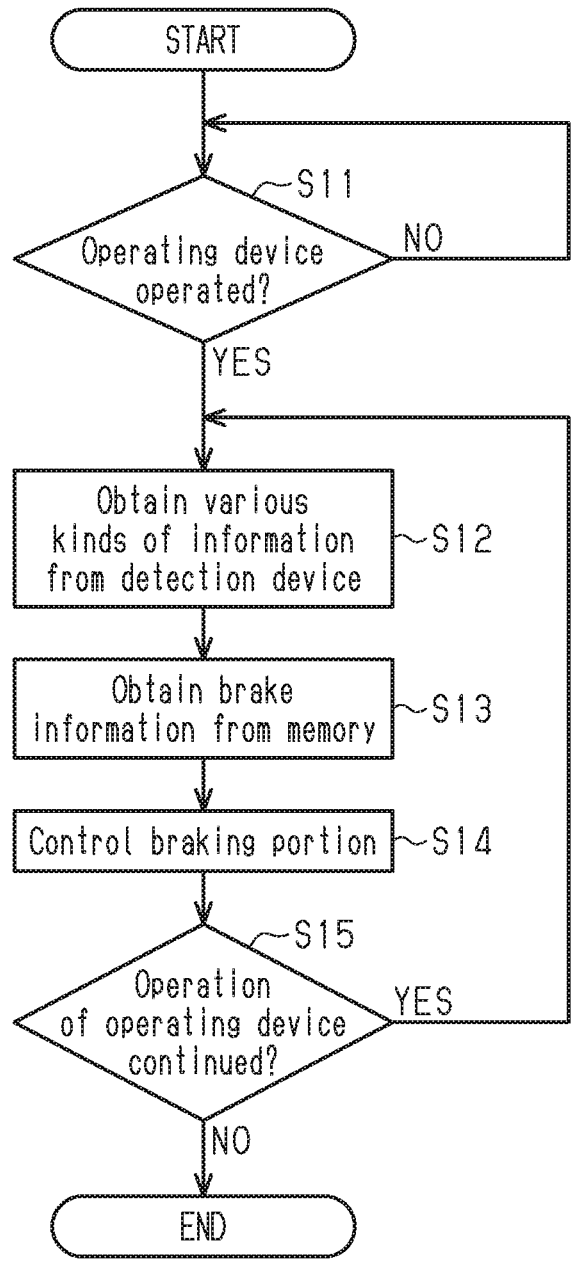
FIG. 6 is a flowchart showing one example of control executed by the brake control device shown in FIG. 2.

Control executed by the brake control device 20 will now be described with reference to FIG. 6. The brake control device 20 executes the following control, for example, in a case where a switch (not shown) installed in the human-powered vehicle A is operated. In an example where the switch is omitted from the human-powered vehicle A, the brake control device 20 constantly executes the following control.

In step S11, the electronic controller 22 determines whether or not one of the operating devices 18 is operated. More specifically, the electronic controller 22 determines whether or not one of the operating devices 18 is operated based on information obtained from the first sensor 26A associated with the corresponding one of the operating devices 18. In a case where it is determined in step S11 that the operating devices 18 are not operated, the process of step S11 is repeated. In a case where it is determined in step S11 that one of the operating devices 18 is operated, the process proceeds to step S12.

In step S12, the electronic controller 22 obtains various kinds of information from the detection device 26. More specifically, the electronic controller 22 obtains the operation amounts S of the operating devices 18 from the first sensors 26A and obtains various kinds of information including the state related to the human-powered vehicle A from one or more of the second sensor 26B to the sixth sensor 26F. In step S13, the electronic controller 22 obtains the brake information BI from the memory 24. More specifically, the electronic controller 22 obtains the brake information BI, from the memory 24, corresponding to various states related to the human-powered vehicle A obtained in step S12.

In step S14, the electronic controller 22 controls the braking portions 14 in accordance with the operation amount S and the brake information BI. More specifically, the electronic controller 22 controls the braking portions 14 in accordance with the operation amount S and the brake information BI obtained in step S13. Thus, the rotary bodies F of the human-powered vehicle A are appropriately braked.

In step S15, the electronic controller 22 detects whether or not the operation of the operating devices 18 is continued. More specifically, the electronic controller 22 determines whether or not the operation of the operating devices 18 is continued based on information obtained from the first sensor 26A. In a case where it is determined in step S15 that the operation of the operating devices 18 is continued, the process returns to step S12. In a case where it is determined in step S15 that the operation of the operating devices 18 is not continued, the process of step S15 ends.

Modifications

The description related to the above embodiment exemplifies, without any intention to limit, applicable forms of a brake control device and a brake system according to the present invention. The brake control device and the brake system according to the present invention are applicable to, for example, modifications of the embodiment that is described above and combinations of at least two of the modifications that do not contradict each other. In the following modifications, the same reference characters are given to those components that are the same as the corresponding components of the embodiment. Such components will not be described in detail.

The configuration of the brake control device 20 can be changed in any manner. In one example, the memory 24 is omitted from the brake control device 20. In this example, the electronic controller 22 appropriately sets the transition aspect of the braking force BF in accordance with the state related to the human-powered vehicle A and controls the braking portions 14 in accordance with the operation amount S of the operating devices 18 and the set transition aspect of the braking force BF.

The relationship between the travel speed TS and the transition aspect of the braking force BF can be changed in any manner. In a first example, the electronic controller 22 sets the transition aspect of the braking force BF to the first state in a case where the travel speed TS is less than the predetermined travel speed, and sets the transition aspect of the braking force BF to the third state in a case where the travel speed TS is greater than or equal to the predetermined travel speed. In a second example, as the travel speed TS increases, the electronic controller 22 decreases the increase rate of the braking force BF with respect to the given operation amount S.

The relationship between the inclination angle IA and the transition aspect of the braking force BF can be changed in any manner. In a first example, the electronic controller 22 sets the transition aspect of the braking force BF to the first state in a case where the inclination angle IA is less than the predetermined angle, and sets the transition aspect of the braking force BF to the third state in a case where the inclination angle IA is greater than or equal to the predetermined angle. In a second example, as the inclination angle IA increases, the electronic controller 22 decreases the increase rate of the braking force BF with respect to the given operation amount S.

The relationship between the gross weight GW and the transition aspect of the braking force BF can be changed in any manner. In a first example, the electronic controller 22 sets the transition aspect of the braking force BF to the first state in a case where the gross weight GW is less than the predetermined weight, and sets the transition aspect of the braking force BF to the third state in a case where the gross weight GW is greater than or equal to the predetermined weight. In a second example, as the gross weight GW increases, the electronic controller 22 decreases the increase rate of the braking force BF with respect to the given operation amount S.

The relationship between the travel resistance RR and the transition aspect of the braking force BF can be changed in any manner. In a first example, the electronic controller 22 sets the transition aspect of the braking force BF to the first state in a case where the travel resistance RR is less than the predetermined resistance, and sets the transition aspect of the braking force BF to the second state in a case where the travel resistance RR is greater than or equal to the predetermined resistance. In a second example, as the travel resistance RR increases, the electronic controller 22 increases the increase rate of the braking force BF with respect to the given operation amount S.

The relationship between the travel environment DE and the transition aspect of the braking force BF can be changed in any manner. In a first example, the electronic controller 22 sets the transition aspect of the braking force BF to the first state in a case where the travel environment DE is the first environment, and sets the transition aspect of the braking force BF to the third state in a case where the travel environment DE is the second environment. In a second example, as the travel environment DE approaches the second environment from the first environment, the electronic controller 22 decreases the increase rate of the braking force BF with respect to the given operation amount S.

The relationship between the first increase rate IR1 and the second increase rate IR2 can be changed in any manner. In a first example, the first increase rate IR1 is less than the second increase rate IR2. In a second example, the first increase rate IR1 is substantially equal to the second increase rate IR2. The same modifications are applied to the relationship between the third increase rate IR3 and the fourth increase rate IR4 and the relationship between the fifth increase rate IF5 and the sixth increase rate IR6.

The configuration of the operating device 18 can be changed in any manner. In one example, the operating device 18 includes a button (not shown). The operation amount S of the operating device 18 is a depressed amount of the button with respect to an initial state in which the button is not operated. In this example, the first sensor 26A includes a movement sensor that detects movement of the button with respect to the initial state.

The configuration of the brake system 10 can be changed in any manner. In a first example, the electric motor E1 of the electric assist unit E is used for applying a braking force to the rear wheel A4. The electric motor E1 is configured to generate electrical energy to charge the battery BT. In this example, the brake device is a regenerative brake device in which the electric motor E1 is the braking portion and an actuator (not shown) is provided to connect the electric motor E1 to the drivetrain B. In a second example, the brake devices 12 are replaced with fluidly operated brakes that each include one of the braking portions 14 and one of the electric actuators 16. In this second example, the braking portions 14 can be fluidly operated calipers and the electric actuators 16 that drive the braking portions 14 by fluid, are in the form of electric pumps. One example of the fluid, which is a power transfer medium, is hydraulic oil. The electric actuators 16 are driven, and the pressure of the fluid is applied to the braking portions 14. The braking portions 14 are configured to brake the rotary bodies F of the human-powered vehicle A by the fluid pressure. In this example, the brake devices 12 are hydraulic brake devices. In a third example, the brake devices 12 can be replaced with brake devices that each include the braking portions 14, and the electric actuators 16 that drive the braking portions 14 by cables. As the electric actuators 16 are driven, and the cables are pulled. The braking portions 14 are configured to brake the rotary bodies F of the human-powered vehicle A as the cables are pulled. In this example, the brake devices are cable-type brake devices. In the second and third examples, the braking portions 14 and the electric actuators 16 can be arranged in a single housing or separately arranged on the human-powered vehicle A.

The type of the human-powered vehicle A can be changed in any manner. In a first example, the type of the human-powered vehicle A is a road bike, a mountain bike, a trekking bike, or a cross bike. In a second example, the type of the human-powered vehicle A is a kick scooter.

What is claimed is:

1. A brake control device comprising:
    an electronic controller configured to output a control signal to electrically control a brake device to apply a braking force to a rotary body rotating in accordance with traveling of a human-powered vehicle,
    the electronic controller being configured to
        vary the braking force applied to a braking portion of the brake device in accordance with an operation amount of an operating device and a state related to the human-powered vehicle as detected by a sensor, and
        set a transition aspect of the braking force associated with driving of the braking portion to vary the braking force corresponding to the operation amount in accordance with the state related to the human-powered vehicle, the transition aspect including a first range of the operation amount having a first rate of increase, and a second range of the operation amount having a second rate of increase, the second rate of increase being different from the first rate of increase, each of the first and second rates of increase being non-zero.

2. The brake control device according to claim 1, wherein the electronic controller is further configured to change the transition aspect of the braking force in a stepped manner in accordance with the operation amount.

3. The brake control device according to claim 1, wherein the state related to the human-powered vehicle includes a travel speed of the human-powered vehicle.

4. The brake control device according to claim 3, wherein the electronic controller is further configured to control the braking portion so that the transition aspect of the braking force in a case where the travel speed is greater than or equal to a predetermined travel speed differs from the transition aspect of the braking force in a case where the travel speed is less than the predetermined travel speed.

5. The brake control device according to claim 1, wherein the state related to the human-powered vehicle includes an inclination angle of the human-powered vehicle.

6. The brake control device according to claim 5, wherein the electronic controller is further configured to control the braking portion so that the transition aspect of the braking force in a case where the inclination angle is greater than or equal to a predetermined angle differs from the transition aspect of the braking force in a case where the inclination angle is less than the predetermined angle.

7. The brake control device according to claim 5, wherein the inclination angle indicates a forward inclination angle of the human-powered vehicle.

8. The brake control device according to claim 1, wherein the state related to the human-powered vehicle includes a gross weight of the human-powered vehicle.

9. The brake control device according to claim 8, wherein the electronic controller is further configured to control the braking portion so that the transition aspect of the braking force in a case where the gross weight is greater than or equal to a predetermined weight differs from the transition aspect of the braking force in a case where the gross weight is less than the predetermined weight.

10. The brake control device according to claim 8, wherein
    the electronic controller is further configured to increase an increase rate of the braking force with respect to a given one of the operation amount as the gross weight increases.

11. The brake control device according to claim 1, wherein
    the state related to the human-powered vehicle includes a travel resistance of the human-powered vehicle.

12. The brake control device according to claim 11, wherein
    the electronic controller is further configured to control the braking portion so that the transition aspect of the braking force in a case where the travel resistance is greater than or equal to a predetermined resistance differs from the transition aspect of the braking force in a case where the travel resistance is less than the predetermined resistance.

13. The brake control device according to claim 11, wherein,
    the electronic controller is further configured to decrease an increase rate of the braking force with respect to a given one of the operation amount as the travel resistance increases.

14. The brake control device according to claim 1, wherein
    the state related to the human-powered vehicle includes a travel environment of the human-powered vehicle.

15. The brake control device according to claim 14, wherein
    the electronic controller is further configured to control the braking portion so that the transition aspect of the braking force in a case where the travel environment is a first environment differs from the transition aspect of the braking force in a case where the travel environment is a second environment.

16. The brake control device according to claim 1, further comprising
    a memory configured to store information specifying a relationship among the operation amount, the state related to the human-powered vehicle, and the braking force.

17. A brake system comprising the brake control device according to claim 1, and further comprising:
    the brake device that includes the braking portion; and
    an electric actuator that drives the braking portion in response to the control signal from the electronic controller.

18. The brake system according to claim 17, wherein
    the electric actuator includes an electric motor that is different from an electric motor assisting propulsion force of the human-powered vehicle.

19. The brake system according to claim 17, wherein
    the electric actuator is provided to the braking portion.

20. The brake system according to claim 17, further comprising the operating device.

21. The brake system according to claim 20, wherein the operating device includes a lever.

\* \* \* \* \*